United States Patent
Belowich et al.

(10) Patent No.: US 11,028,230 B1
(45) Date of Patent: Jun. 8, 2021

(54) METHOD FOR CONDENSATION POLYMERIZATION OF HYDROXYL-TERMINATED POLYDIORGANOSILOXANES

(71) Applicants: Dow Silicones Corporation, Midland, MI (US); Dow Global Technologies LLC, Midland, MI (US)

(72) Inventors: Matthew Belowich, Midland, MI (US); Mark Rickard, Midland, MI (US); Vladimir Pushkarev, Mount Pleasant, MI (US); Shaungbing Han, Midland, MI (US); Evelyn Auyeung, Houston, TX (US); John Roberts, Midland, MI (US); Thomas Peterson, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/259,720

(22) PCT Filed: Jul. 3, 2019

(86) PCT No.: PCT/US2019/040441
§ 371 (c)(1),
(2) Date: Jan. 12, 2021

(87) PCT Pub. No.: WO2020/040885
PCT Pub. Date: Feb. 27, 2020

Related U.S. Application Data

(60) Provisional application No. 62/722,345, filed on Aug. 24, 2018.

(51) Int. Cl.
*C08G 77/08* (2006.01)

(52) U.S. Cl.
CPC .................... *C08G 77/08* (2013.01)

(58) Field of Classification Search
CPC ........ C08G 77/16; C08G 77/08; C08G 77/10; B01J 27/02
See application file for complete search history.

(56) References Cited

U.S. PATENT DOCUMENTS

| | | | |
|---|---|---|---|
| 2,906,734 A | 9/1959 | Clark | |
| 3,105,061 A | 9/1963 | Bruner | |
| 3,160,301 A | 12/1964 | Milbourne | |
| 3,308,208 A | 3/1967 | Seil et al. | |
| 4,431,771 A | 2/1984 | Falender et al. | |
| 4,448,927 A | 5/1984 | Falender et al. | |
| 4,486,567 A | 12/1984 | Bowman et al. | |
| 4,508,887 A | 4/1985 | Kohl | |
| 4,525,470 A | 6/1985 | Kohl | |
| 5,073,618 A | 12/1991 | Westall | |
| 5,109,093 A | 4/1992 | Rees et al. | |
| 5,109,094 A | 4/1992 | Rees et al. | |
| 5,198,518 A | 3/1993 | Yamamoto et al. | |
| 5,256,755 A | 10/1993 | Westall | |
| 5,344,906 A | 9/1994 | Westall | |
| 5,492,992 A | 2/1996 | Gilson | |
| 6,737,495 B2 | 5/2004 | Bordone et al. | |
| 6,964,753 B2 | 11/2005 | Gilson | |
| 7,064,173 B2 | 6/2006 | Rubinsztajn et al. | |
| 7,238,768 B2 | 7/2007 | Hupfield et al. | |
| 7,612,222 B2 | 11/2009 | Wood | |
| 7,759,446 B2 | 7/2010 | Geisberger et al. | |
| 8,030,429 B2 | 10/2011 | Sugiura et al. | |
| 8,487,037 B2 | 7/2013 | Stammer et al. | |
| 8,580,729 B2 | 11/2013 | Davio et al. | |
| 8,580,862 B2 | 11/2013 | Barnes et al. | |
| 8,735,493 B2 | 5/2014 | Stammer et al. | |
| 8,853,309 B2 | 10/2014 | Yano et al. | |
| 8,962,716 B2 | 2/2015 | Wakabayashi et al. | |
| 9,234,117 B2 | 1/2016 | Yamate et al. | |
| 2008/0255322 A1 | 10/2008 | Boisson et al. | |
| 2010/0331483 A1 | 12/2010 | Briehn et al. | |
| 2012/0027708 A1 | 2/2012 | Durand et al. | |
| 2014/0100347 A1* | 4/2014 | Cook ....................... | C08K 3/01 528/15 |
| 2015/0057412 A1 | 2/2015 | Knott et al. | |
| 2016/0145395 A1 | 5/2016 | Surgenor et al. | |
| 2017/0107413 A1 | 4/2017 | Wang et al. | |

FOREIGN PATENT DOCUMENTS

| | | |
|---|---|---|
| EP | 0314315 | 1/1994 |
| EP | 2155804 | 8/2018 |
| GB | 2390092 | 12/2003 |
| GB | 2468952 | 9/2010 |
| WO | 2004000851 | 12/2003 |
| WO | 2006106095 | 10/2006 |

(Continued)

OTHER PUBLICATIONS

Wikipedia (https://en.wikipedia.org/wiki/Work-up_(chemistry))(Wikipedia, Jul. 2016).*
Freeman (Silicones, Published for the Plastics Institute, ILIFEE Books, Ltd. 1962).*
Cypryk, et al, Acid-Catalyzed Condensation of Model Oligo(dimethylsiloxanddiol)s; Macromolecules, 1994, 27, 6245-6253.
Yashiro, et al, Polymerization of Cyclosiloxanes by Means of Triflic Acid and Metal Triflates; Macromolecular Chemistry and Physics, 2010, 211, 1311-1321, 2010 Wiley-VCH Verlag GmbH & Co. KGaA, Weinhelm.

(Continued)

*Primary Examiner* — Kuo Liang Peng

(57) ABSTRACT

A method for making long chain hydroxyl terminated polydiorganosiloxanes with low cyclics content via condensation polymerization employs a trifluoromethane sulfonate compound catalyst. The trifluoromethane sulfonate may be complexed with a multidentate ligand.

16 Claims, No Drawings

(56) References Cited

FOREIGN PATENT DOCUMENTS

| | | |
|---|---|---|
| WO | 2006106360 | 10/2006 |
| WO | 2006106362 | 10/2006 |
| WO | 2006107762 | 10/2006 |
| WO | 2008111598 | 10/2006 |
| WO | 2010108853 | 9/2010 |
| WO | 2013009836 | 1/2013 |
| WO | 2013009840 | 1/2013 |
| WO | 2013101755 | 7/2013 |

OTHER PUBLICATIONS

Merker et. al., Random and Block Copolymers of Poly(tetramethyl-p-Silphenylene-Siloxane) and Polydimethylsiloxane; J. Poly. Sci. Part A 1964, vol. 2, pp. 31-44.

\* cited by examiner

METHOD FOR CONDENSATION POLYMERIZATION OF HYDROXYL-TERMINATED POLYDIORGANOSILOXANES

CROSS REFERENCE TO RELATED APPLICATIONS

This application claims the benefit of U.S. Provisional Patent Application No. 62/722,345 filed 24 Aug. 2018 under 35 U.S.C. § 119 (e). U.S. Provisional Patent Application No. 62/722,345 is hereby incorporated by reference.

TECHNICAL FIELD

This invention relates to a method for condensation polymerization of hydroxyl-terminated polydiorganosiloxanes. The method employs a trifluoromethane sulfonate (triflate) compound as a catalyst that minimizes production of cyclic polydiorganosiloxane by-products.

BACKGROUND

Organosiloxane oligomers and short chain polymers having hydroxyl groups may be polymerized via condensation reaction to high molecular weight, high degree of polymerization (DP), polymers by polymerization in the presence of a suitable condensation reaction catalyst. Condensation polymerization of hydroxyl functional organosiloxanes occurs with the elimination of water as a by-product. Previous methods employed Brønsted acids, Brønsted bases, or phosphonitriles as catalysts. Although these catalysts can be highly active (to produce product with high DP), they tend to produce large quantities (>1000 ppm) of the cyclic by-product, octamethylcyclotetrasiloxane (D4), in the resulting hydroxyl-functional polydiorganosiloxane product.

Problem to be Solved

There is an industry need to produce high molecular weight, high degree of polymerization polyorganosiloxanes with lower D4 content than achieved with previous methods, described above.

SUMMARY

A method for polymerizing polydiorganosiloxanes comprises:
1) heating, at a temperature of 50° C. to 200° C., a reaction mixture prepared by mixing starting materials comprising
   A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
   B) 10 ppm to 500 ppm, based on weight of starting material A), of a trifluoromethane sulfonate compound selected from the group consisting of
      B-1) aluminum(III) trifluoromethane sulfonate,
      B-2) bismuth(III) trifluoromethane sulfonate,
      B-3) gallium(III) trifluoromethane sulfonate,
      B-4) iron(III) trifluoromethane sulfonate,
      B-5) indium(III) trifluoromethane sulfonate,
      B-6) scandium(III) trifluoromethane sulfonate, and
      B-7) dicyclohexylboron trifluoromethane sulfonate;
2) quenching the reaction mixture; and
3) recovering a product from the reaction mixture, where the product has unit formula $[(HO)R_2SiO_{1/2}]_2(R_2SiO_{2/2})_m$, where m>n.

DETAILED DESCRIPTION

A method for polymerizing polydiorganosiloxanes to produce a hydroxyl-terminated polydiorganosiloxane product having higher DP than the starting material and low D4 content comprises:
optionally, pre-1) mixing B) a trifluoromethane sulfonate compound and C) a chelating ligand for the trifluoromethane sulfonate compound before step 1);
1) heating, at a temperature of 50° C. to 200° C., a reaction mixture prepared by mixing starting materials comprising
   A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
   B) 10 ppm to 500 ppm, based on weight of starting material A), of the trifluoromethanesulfonate compound, which is selected from the group consisting of
      B-1) aluminum(III) trifluoromethanesulfonate,
      B-2) bismuth(III) trifluoromethanesulfonate,
      B-3) gallium(III) trifluoromethanesulfonate,
      B-4) iron(III) trifluoromethanesulfonate,
      B-5) indium(III) trifluoromethanesulfonate,
      B-6) scandium(III) trifluoromethanesulfonate, and
      B-7) dicyclohexylboron trifluoromethanesulfonate;
   optionally C) the chelating ligand; and
   optionally D) a solvent;
2) quenching the reaction mixture; and
3) recovering the product from the reaction mixture, where the product has unit formula $[(HO)R_2SiO_{1/2}]_2(R_2SiO_{2/2})_m$, where m>n. In step 1), B) the trifluoromethane sulfonate compound and, when present, C) the chelating ligand may be combined. Alternatively, when step pre-1) is present, B) the trifluoromethane sulfonate compound and C) the chelating ligand may be combined to form a chelate before step 1).

The method may be performed using a batch reactor or a continuous reactor, such as a gas liquid reactor. Residence time depends on various factors including the temperature selected and the type of reactor. However, step 1) may be performed by heating at a temperature of 80° C. to 105° C. for 30 seconds to 2 hours. The method may be performed at ambient pressure and does not require an inert atmosphere. However, conditions that enable by-product water to be removed may facilitate increasing DP of the product or improving selectivity (minimizing D4 in the product), or both. Therefore, the method may further comprise removing water during and/or after step 1). Selectivity may also be improved when starting material C), the ligand, is added. Alternatively, the method may be performed under conditions in which water is not removed during step 1). Step 2) may be performed by adding E) an amine and cooling the reaction mixture to a temperature less than 50° C. Step 3) may be performed by a method comprising filtering, stripping and/or distilling the reaction mixture.

The method described above can produce a hydroxyl-terminated polydiorganosiloxane having a DP higher than that of starting material A) and a low D4 content. For example, D4 content in the product may be <400 ppm, alternatively <300 ppm. The minimum amount of D4 may be 0, alternatively 100 ppm. And, when starting material A) has a DP<50, DP of the product may be >300, alternatively >400, alternatively >500, alternatively >1000, alternatively >1500, and alternatively >2000. Alternatively, when starting material A) has a DP<50, DP of the product may be 300 to 3000, alternatively 400 to 2500, alternatively 500 to 2000.

Starting Material A) Polydiorganosiloxane

Starting material A) is a polydiorganosiloxane comprising unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms. Suitable monovalent hydrocarbon groups for R may be selected from the group consisting of alkyl, alkenyl, and aryl. Exemplary alkyl groups include methyl, ethyl, propyl (including n-propyl and iso-propyl), butyl (including n-butyl, t-butyl, iso-butyl and sec-butyl), and hexyl groups (including branched and linear isomers thereof). Exemplary alkenyl groups include vinyl, allyl, and hexenyl (including branched and linear isomers thereof). Exemplary aryl groups include phenyl, tolyl, xylyl, naphthyl, and benzyl. Alternatively, each alkyl may be methyl, each alkenyl may be selected from the group consisting of vinyl, allyl, and hexenyl, and each aryl may be phenyl. Alternatively, 50% to 100%, alternatively 80% to 100%, and alternatively 90% to 100% of all instances of R are alkyl groups such as methyl. Alternatively, the R groups on starting material A) may be methyl and phenyl. Alternatively, the R groups on starting material A) may be methyl and vinyl. In starting material A), subscript n is 0 to 2000. Alternatively, subscript n may be 5 to 2000, alternatively 5 to 200, alternatively 10 to 150, alternatively 15 to 100, alternatively 20 to 50, and alternatively 25 to 35. One skilled in the art would recognize that starting material A) may be substantially linear, alternatively starting material A) is linear. Furthermore, starting material A) may contain a small number of additional siloxane units, such as those of formula $(HORSiO_{2/2})$, $(RSiO_{3/2})$ and/or $(SiO_{4/2})$ provided that starting material A) is substantially linear. Examples of starting material A) include bis-hydroxy terminated polydimethylsiloxane. Suitable polydiorganosiloxanes for starting material (A) may be prepared by methods known in the art such as the addition of diorganodichlorosilanes to a water/solvent mixture to yield a mixture of low molecular weight hydroxy end-blocked polydiorganosiloxanes and cyclic siloxanes in solvent. The mixture may be purified to separate hydroxy end-blocked polydiorganosiloxanes and cyclic polysiloxanes. Alternatively, suitable bis-hydroxy terminated polydimethylsiloxane are commercially available from Dow Silicones Corporation of Midland, Mich., USA.

Starting Material B) Trifluoromethane Sulfonate Compound

Starting material B) is a trifluoromethane sulfonate compound (triflate compound). Starting material B) is used in the method in an amount of 10 ppm to 500 ppm, based on the weight of starting material A). Starting material B) is selected from the group consisting of: B-1) aluminum(III) trifluoromethane sulfonate, B-2) bismuth(III) trifluoromethane sulfonate, B-3) gallium(III) trifluoromethane sulfonate, B-4) iron(III) trifluoromethane sulfonate, B-5) indium(III) trifluoromethane sulfonate, B-6) scandium(III) trifluoromethane sulfonate, and B-7) dicyclohexylboron trifluoromethane sulfonate. Alternatively, starting material B) may be selected from the group consisting of B-1) aluminum(III) trifluoromethane sulfonate, B-2) bismuth(III) trifluoromethane sulfonate, B-3) gallium(III) trifluoromethane sulfonate, B-4) iron(III) trifluoromethane sulfonate, and B-5) indium (III) trifluoromethane sulfonate. Alternatively, starting material B) may be any one of B1), B2), B3), B4), B5), and B6). Alternatively, starting material B) may be selected from the group consisting of B-2) bismuth(III) trifluoromethane sulfonate, B-3) gallium(III) trifluoromethane sulfonate, and B-4) iron(III) trifluoromethane sulfonate. Alternatively, starting material B) may be selected from the group consisting of B-1) aluminum(III) trifluoromethane sulfonate, B-5) indium(III) trifluoromethane sulfonate, and B-6) scandium(III) trifluoromethane sulfonate. Alternatively, starting material B) may be selected from the group consisting of B-1) aluminum(III) trifluoromethane sulfonate and B-5) indium(III) trifluoromethane sulfonate. In one embodiment, starting material B) may be combined with starting material C), a ligand, before step 1) of the method described herein. Suitable trifluoromethane sulfonate compounds are commercially available, e.g., from Sigma-Aldrich, Fischer Scientific, or Alfa Aesar.

Starting Material C) Ligand

Starting material C) may optionally be added in the method described herein. In this embodiment, starting material C) and starting material B) may be combined before step 1) by any convenient means, such as mixing. In one embodiment, starting material C) may be a bisimine ligand. Starting material C) may have general formula:

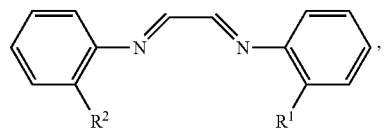

where each $R^2$ and each $R^1$ are an independently selected alkyl groups of 1 to 8 carbon atoms, alternatively 1 to 6 carbon atoms, and alternatively 2 to 5 carbon atoms. Alternatively, $R^1$ and $R^2$ may each be a butyl group, such as a tert-butyl group. Suitable bisimine ligands such as 1,2-bis-(2-di-iso-propylphenyl) imino)ethane or 1,2-bis(2-di-tert-butylphenyl)imino)ethane are commercially available, e.g., from Sigma-Aldrich.

Alternatively, starting material C) may be

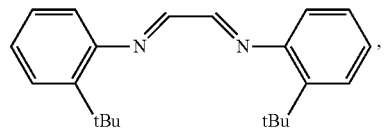

where tBu represents a t-butyl group. The amount of ligand added depends on various factors including which triflate compound is selected for starting material B) and the DP desired in the product, however, the amount of ligand may be 1 molar equivalent to 2 molar equivalents based on the amount of starting material B).

Starting Material D) Solvent

Starting material D), a solvent, may optionally be used in the method described herein. The solvent may be used to deliver one or more of the other starting materials. For example, the ligand may be dissolved in a solvent before combining the ligand and the metal triflate. Alternatively, the metal triflate may be dissolved in a solvent before combining with the metal triflate in step pre-1) described above, or before combining with starting material A) in step 1). The solvent may be an aprotic solvent, such as tetrahydrofuran, toluene, or dichloromethane. Alternatively, the solvent may be a low molecular weight trimethylsiloxy-terminated polydimethylsiloxane, such as an OS Fluid, which is commercially available from Dow Silicones Corporation of Midland, Mich., U.S.A. The solvent may be used to deliver one or more starting materials (i.e., one or more starting materials may be dissolved in solvent before step 1), the reaction may proceed in solvent, or both. The amount of solvent depends on various factors including the type and amount of starting materials A), B), and C) selected and whether one or more starting materials is being delivered in a solvent, or whether the reaction will proceed in a solvent. For example, when present, the amount may be sufficient to form a reaction mixture with a concentration of starting material A) of 0.1 M-0.5 M.

Starting Material E) Amine

Starting material E) the amine is used to quench the reaction mixture in step 2) of the method described herein. The amine may be an alkyl amine such as trimethylamine, triethylamine, or N,N-dimethylcyclohexylamine. The amount of amine may be 100 ppm to 100,000 ppm of amine based on total weight of all starting materials used in the method. Alternatively, the amount of amine may be 100 ppm to 1000 ppm on the same basis. Suitable amines are commercially available, e.g., from Sigma-Aldrich or Fisher Scientific.

Product

The product of the method described herein is a bis-hydroxyl terminated polydiorganosiloxane of unit formula $[(HO)R_2SiO_{1/2}]_2(R_2SiO_{2/2})_m$, where R is as described above for starting material A), and subscript m has a value greater than subscript n in starting material A). For example, in the product described above, subscript m may have a value ranging from (n+250) to (n+2500), alternatively (n+300) to (n+2400), alternatively (n+350) to (n+2300), alternatively (n+400) to (n+2000), alternatively (n+450) to (n+1500).

EXAMPLES

These examples are intended to illustrate some embodiments of the invention and should not be interpreted as limiting the scope of the invention set forth in the claims.

Comparative Example 1—Polymerization of Bis-Hydroxyl-Terminated Polydimethylsiloxane with Trifluoromethanesulfonic Acid (Entry 12 in Table 1)

A 40 mL glass vial was filled with 10 g of bis-hydroxy terminated poly(dimethylsiloxane) having an average DP of 35 and equipped with a stir bar. The bis-hydroxy terminated poly(dimethylsiloxane) was obtained from Dow Silicones Corporation of Midland, Mich., USA. The vial was heated to 80° C., and 71 μL of trifluoromethanesulfonic acid (as a 0.01 M solution in anhydrous dichloromethane) was added to the bis-hydroxy terminated poly(dimethylsiloxane) to initiate polymerization. Stirring was continued for 2 hr at 80° C. with open caps before the solutions were quenched by adding 2 drops of N,N-dimethylcyclohexylamine (as a 1% solution in toluene), and cooling to room temperature. Analysis of the crude reaction mixture by GPC indicated a final degree of polymerization of 1117, while headspace GC measured 3,678 ppm of residual D4.

Reference Example 2—General Procedure

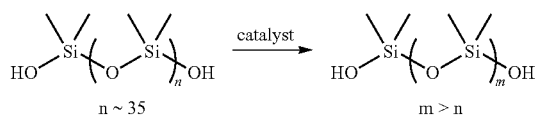

Samples were prepared as follows. A 40 mL glass vial was filled with 10 g of bis-hydroxy terminated poly(dimethylsiloxane) having an average DP of 35 and equipped with a sandwich-style rare earth magnet stirbar. The vial was heated to 80° C. or 105° C., and a trifluoromethane sulfonate compound (as a 0.01 M solution in anhydrous THF) was added to the bis-hydroxy terminated poly(dimethylsiloxane) to initiate polymerization. Stirring was continued for 2 hr at 80° C. or 105° C. with open caps before the resulting solution was quenched by adding 2 drops of N,N-dimethylcyclohexylamine (as a 1% solution in toluene), and cooling to room temperature. Analysis of the resulting crude reaction mixture by GPC indicated a final degree of polymerization, while headspace GC measured residual octamethylcyclotetrasiloxane. The trifluoromethane sulfonate compound, temperature, concentration of metal triflate, degree of polymerization of the bis-hydroxy terminated polydimethylsiloxane prepared by the method, residual D4 in the bis-hydroxy terminated polydimethylsiloxane prepared by the method and DP/D4 ratio are shown below in Table 1. Other catalysts tested were Nonafluorobutane-1-sulfonic acid, Dicyclohexylboron trifluoromethanesulfonate, and Phosphonitrilic Chloride Catalyst were used instead of the metal triflate catalyst.

TABLE 1

Comparison of Metal Triflates and Other Catalysts

| Entry | Catalyst | Temp (° C.) | Catalyst Concentration (mol/L) | Degree of Polymerization (DP) | Residual D4 (ppm) | DP/D4 |
|---|---|---|---|---|---|---|
| 1 | Bismuth(III)Triflate | 80 | $1.44 \times 10^{-5}$ | 1004 | 140 | 7.17 |
| 2 | Gallium(III) Triflate | 80 | $1.44 \times 10^{-5}$ | 1054 | 229 | 4.60 |
| 3 | Indium(III)Triflate | 80 | $1.44 \times 10^{-5}$ | 677 | 147 | 4.61 |
| 4 | Iron(III) Triflate | 80 | $1.44 \times 10^{-5}$ | 1132 | 173 | 6.54 |
| 5 | Scandium(III) Triflate | 80 | $1.44 \times 10^{-5}$ | 224 | 103 | 2.17 |
| 6 | Aluminum(III)Triflate | 80 | $1.44 \times 10^{-5}$ | 598 | 151 | 3.96 |

TABLE 1-continued

Comparison of Metal Triflates and Other Catalysts

| Entry | Catalyst | Temp (° C.) | Catalyst Concentration (mol/L) | Degree of Polymerization (DP) | Residual D4 (ppm) | DP/D4 |
|---|---|---|---|---|---|---|
| 7 | Dicyclohexylboron trifluoromethanesulfonate | 80 | $1.44 \times 10^{-5}$ | 476 | 164 | 2.90 |
| 8 (comp) | Copper(II)Triflate | 80 | $7.19 \times 10^{-5}$ | 118 | 55 | 2.15 |
| 9 (comp) | Yttrium(III)Triflate | 80 | $7.19 \times 10^{-5}$ | 54 | 73 | 0.74 |
| 10 (comp) | Cerium(IV) Triflate | 80 | $7.19 \times 10^{-5}$ | 226 | 132 | 1.71 |
| 11 (comp) | Nonafluorobutane-1-sulfonic acid | 80 | $7.19 \times 10^{-5}$ | 1948 | 4844 | 0.40 |
| 12 (comp) | Trifluoromethanesulfonic acid | 80 | $7.19 \times 10^{-5}$ | 1117 | 3678 | 0.30 |
| 13 | Bismuth(III)Triflate | 105 | $1.44 \times 10^{-5}$ | 746 | 152 | 4.91 |
| 14 | Gallium(III) Triflate | 105 | $1.44 \times 10^{-5}$ | 818 | 193 | 4.24 |
| 15 | Indium(III)Triflate | 105 | $1.44 \times 10^{-5}$ | 445 | 110 | 4.05 |
| 16 | Iron(III) Triflate | 105 | $1.44 \times 10^{-5}$ | 673 | 155 | 4.34 |
| 17 | Scandium(III) Triflate | 105 | $1.44 \times 10^{-5}$ | 187 | 62 | 3.02 |
| 18 | Aluminum(III)Triflate | 105 | $1.44 \times 10^{-5}$ | 481 | 108 | 4.45 |
| 19 | Dicyclohexylboron trifluoromethanesulfonate | 105 | $1.44 \times 10^{-5}$ | 372 | 99 | 3.76 |
| 20 (comp) | Phosphonitrilic Chloride Catalyst* | 105 | $7.19 \times 10^{-5}$ | 1189 | 670 | 1.77 |
| 20 (comp) | Phosphonitrilic Chloride Catalyst* | 105 | $2.88 \times 10^{-5}$ | 3585 | 14346 | 0.25 |

*The phosphonitrilic chloride catalyst is a mixture of $[Cl_3P=N-PCl_2=N-PCl_3]^+[P_XCl_{5X+1}]^-$ and $[Cl_3P=N-PCl_2=N-PCl_2=N-PCl_3]^+[P_XCl_{5X+1}]^-$ The DP/D4 ratio shown in the tables herein was calculated by dividing the difference in DP between the final product and starting material A) by the amount of D4 generated. Generally, high DP/D4 ratio is desired, provided that DP increased sufficiently.

Example 3—General Procedure

Samples were prepared as described above in Reference Example 2, except that heating was performed for 2 hr at 105° C. and loading of the triflate was 25 ppm. Table 2, below, shows the degree of polymerization for each catalyst with bis-hydroxy terminated poly(dimethylsiloxane) after 2 hr at 105° C.

TABLE 2

| Entry | Metal Triflate Salt | DP |
|---|---|---|
| 21 | Bismuth (III) Triflate | 2,350 |
| 22 | Iron (III) Triflate | 2,008 |
| 23 | Gallium (III) Inflate | 1,732 |
| 24 | Indium (III) Triflate | 591 |
| 25 | Aluminum (III) Triflate | 430 |
| 26 | Scandium (III) Triflate | 317 |
| 27 (comp) | Cerium (IV) Triflate | 241 |
| 28 (comp) | Copper (II) Triflate | 118 |
| 29 (comp) | Ytterbium (III) Triflate | 54 |
| 30 (comp) | Zinc (II) Triflate | 42 |
| 31 (comp) | Yttrium (III) Triflate | 40 |
| 32 (comp) | Samarium (III) Triflate | 32 |
| 33 (comp) | Cerium (III) Triflate | 32 |

Tables 1 and 2 show that under the conditions tested, only certain metal triflates produced a bis-hydroxy terminated polydimethylsiloxane with sufficient chain extension (as shown by increase in DP) and low D4 content. For example, Copper(III) triflate, Yttrium (III) triflate, Cerium (IV) triflate, Cerium (III) triflate, Ytterbium (III) triflate, Zinc (III) triflate, and Samarium(III) triflate did not produce sufficient increase in DP of the product under the conditions tested.

Example 4—Addition of Ligands

Samples were prepared as follows. A metal triflate and 1 or 2 molar equivalents of a ligand were dissolved in anhydrous THF to prepare a metal triflate.ligand solution. A 40 mL glass vial was filled with 10 g of bis-hydroxy terminated poly(dimethylsiloxane) having an average DP of 35 and equipped with a sandwich-style rare earth magnet stirbar. The vial was heated to 105° C., and metal triflate.ligand solution at a concentration of 0.01 M was added to the bis-hydroxy terminated poly(dimethylsiloxane) to initiate polymerization. Stirring was continued for 2 hr at 105° C. with open caps before the resulting solutions were quenched by adding 2 drops of N,N-dimethylcyclohexylamine (as a 1% solution in toluene) to each vial, and cooling to room temperature. Analysis of the resulting crude reaction mixtures by gel permeation chromatography (GPC) indicated a final degree of polymerization, and headspace gas chromatography (GC) measured residual D4. Table 3, below, shows the metal triflate or metal triflate.ligand tested, the concentration at which it was added, DP, and amount of D4 in the product.

Ligands tested were as follows.

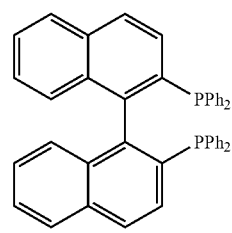

A

-continued

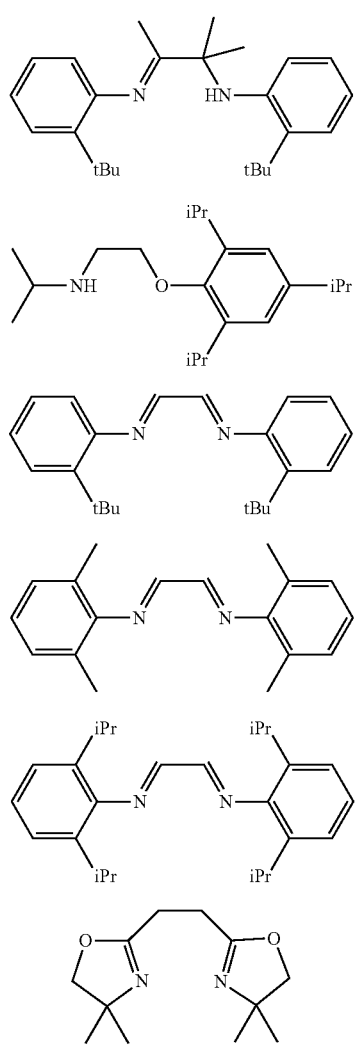

TABLE 3

| Entry | Catalyst | Catalyst Concentration (mol/L) | DP | Residual D4 (ppm) | DP/D4 |
|---|---|---|---|---|---|
| 34 (comp) | BiOTf$_3$•2A | $3.60 \times 10^{-5}$ | 814 | 459 | 1.9 |
| 35 (comp) | BiOTf$_3$•2B | $1.44 \times 10^{-4}$ | 373 | 160 | 3.1 |
| 36 (comp) | BiOTf$_3$•2C | $1.44 \times 10^{-4}$ | 138 | — | — |
| 37 | BiOTf$_3$•2D | $1.44 \times 10^{-4}$ | 1168 | 282 | 4.9 |
| 38 (comp) | BiOTf$_3$•2E | $1.44 \times 10^{-4}$ | 438 | 201 | 2.7 |
| 39 (comp) | BiOTf$_3$•2F | $1.44 \times 10^{-4}$ | 328 | 162 | 2.6 |
| 40 (comp) | BiOTf$_3$•2G | $1.44 \times 10^{-4}$ | 38 | — | — |
| 41 | BiOTf$_3$ | $2.88 \times 10^{-5}$ | 1007 | 442 | 2.5 |

Table 3 shows that the ligand of formula

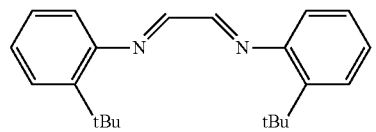 [SMILES: CC(C)(C)c1ccccc1/N=C/C=N/c1ccccc1C(C)(C)C]

improved performance (with higher DP and lower D4) than bismuth(III) triflate alone under the conditions tested in Example 3.

Example 5—Addition of Ligands

Samples were prepared as follows. A metal triflate and 1 or 2 molar equivalents of ligand D were dissolved in anhydrous THF to prepare a metal triflate.ligand solution. A 40 mL glass vial was filled with 10 g of bis-hydroxy terminated poly(dimethylsiloxane) having an average DP of 35 and equipped with a sandwich-style rare earth magnet stirbar. The vial was heated to 105° C., and metal triflate-.ligand solution at a concentration of 0.01 M was added to the bis-hydroxy terminated poly(dimethylsiloxane) to initiate polymerization. Stirring was continued for 2 hr at 105° C. with open caps before the resulting solutions were quenched by adding 2 drops of N,N-dimethylcyclohexylamine (as a 1% solution in toluene) to each vial, and cooling to room temperature. Analysis of the resulting crude reaction mixtures by GPC indicated a final degree of polymerization, and headspace measured residual 4. Table 4, below, shows the metal triflate or metal triflate.ligand tested, the concentration at which it was added, DP, and amount of D4 in the product.

TABLE 4

| Entry | Catalyst | Molar equivalents of ligand | Catalyst Concentration (mol/L) | DP | Residual D4 (ppm) | ΔDP/D4 |
|---|---|---|---|---|---|---|
| 42 | Bi(OTf)$_3$ | 0 | $3.60 \times 10^{-5}$ | 1239 | 332 | 4.3 |
| 43 | Bi(OTf)$_3$•D | 1 | $1.44 \times 10^{-4}$ | 846 | 133 | 6.1 |
| 44 | Bi(OTf)$_3$•2D | 2 | $3.60 \times 10^{-5}$ | 1193 | 186 | 8.5 |
| 45 | Fe(OTf)$_3$ | 0 | $1.44 \times 10^{-5}$ | 673 | 155 | 6.1 |
| 46 (comparative) | Fe(OTf)$_3$•D | 1 | $3.60 \times 10^{-5}$ | 274 | — | — |
| 47 | Fe(OTf)$_3$•2D | 2 | $1.44 \times 10^{-4}$ | 676 | 110 | 10.7 |
| 48 | Ga(OTf)$_3$ | 0 | $3.60 \times 10^{-5}$ | 2132 | 333 | 7.4 |
| 49 (comparative) | Ga(OTf)$_3$•D | 1 | $3.60 \times 10^{-5}$ | 1189 | 581 | 2.0 |
| 50 | Ga(OTf)$_3$•2D | 2 | $3.60 \times 10^{-5}$ | 1323 | 177 | 10.1 |

TABLE 4-continued

| Entry | Catalyst | Molar equivalents of ligand | Catalyst Concentration (mol/L) | DP | Residual D4 (ppm) | ΔDP/D4 |
|---|---|---|---|---|---|---|
| 51 | In(OTf)$_3$ | 0 | 3.60 × 10$^{-5}$ | 1014 | 232 | 5.4 |
| 52 | In(OTf)$_3$•D | 1 | 3.60 × 10$^{-5}$ | 1120 | 198 | 5.5 |
| 53 | In(OTf)$_3$•2D | 2 | 3.60 × 10$^{-5}$ | 1188 | 196 | 7.9 |
| 54 | Al(OTf)$_3$ | 0 | 3.60 × 10$^{-5}$ | 1131 | 169 | 9.2 |
| 55 | Al(OTf)$_3$•D | 1 | 3.60 × 10$^{-5}$ | 1160 | 218 | 5.2 |
| 56 | Al(OTf)$_3$•2D | 2 | 3.60 × 10$^{-5}$ | 1155 | 120 | 16.0 |

Reference Example 6—Molecular Distribution

Molecular distribution of starting materials can be analyzed by GPC equipped with triple detector array (Refractive Index, Right Angle Light Scattering, and Viscometer). 0.5% of samples were used for GPO analysis. Mw of Polystyrene standards were in the range of 580 to 100,000, and a 3$^{rd}$ order calibration curve was used for molecular weight determination. Both samples and standards were diluted in HPLC grade ethyl acetate.

Reference Example 7—D4 Concentration

D4 Concentration measurements were made using the following instruments, procedures, and quantitation methods.
GC-HP 6890
  Gradient: 50° C. (1 min)—220° C. @ 10° C./min (no hold); Inlet: Split 1:20, 9.68 psi, 150° C.; Flow: 2 mL/min FID: Hydrogen 40 mL/min, Air 450 mL/min, Makeup 45 mL/min, Temperature 260° C.; Column: RTX-1, 30 m/320 μm/0.25 μm
Headspace Unit—Perkin-Elmer TurboMatrix 40
  Incubation: 120° C. for 10 min with shaking; Syringe: 125° C.; Transfer Line: 130° C.; Pressurize: 3 min; Withdraw: 0.5 min; Column pressure: 20 psi; Injection: 0.15 min/0.3 mL; GC cycle: 25 min
Sample Preparation
  Internal standards were prepared to be 0.01% dodecane by weight in Fisher Brand 19 fluid vacuum oil. 1 mL of internal standard solution was added to a 20 mL headspace vial (with Eppendorf repeater pipet). 100 mg of D4 standard (usually 100 ppm standard used) or 100 mg of experimental sample was added to the headspace vial.
Quantitation:
  Quantitation of the D4 content was by the single point internal standard method. A relative response factor (RRF) of D4 relative to dodecane was established and updated every time a new batch of internal standard solution was prepared. The amount of D4 in the samples was determined within the Thermo Atlas data system according to an equation of the same type as the one below:

$$Conc_{D4} = \frac{RRF * Area_{D4}}{Area_{dodecane} * weight_{sample}}.$$

INDUSTRIAL APPLICABILITY

Bis-hydroxy terminated silicone polymers produced by Dow Silicones Corporation can contain approximately 1000 ppm D4 as a by-product. The inventors surprisingly found that several triflate compounds generate significantly less octamethylcyclotetrasiloxane than the conventional catalysts used under the conditions tested in the examples above. The inventors further found that several ligands can improve the selectivity in silanol condensation polymerizations when combined with a metal triflate salt under the conditions tested in the examples above. In each case the selectivity for each catalyst was determined by dividing the change in the degree of polymerization by the amount of D4 produced in the reaction (ΔDP/ΔD4). The initial ligand screen identified bisimine D as the optimal ligand for reducing D4 generation, increasing ΔDP/ΔD4 from 2.5 for Bi(OTf)$_3$ to 4.9 for the Bi(OTf)$_3$.2D complex (Table 3).

Definitions and Usage of Terms

All amounts, ratios, and percentages are by weight unless otherwise indicated by the context of the specification. The SUMMARY and the ABSTRACT are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 0 to 2000 includes not only the range of 0 to 2000, but also 1, 2, 5, 20, 25, 30, 35, 40, 45, 50, 55, 60, 65, 70, 75, 80, 90, 100, 200, 300, 400, 500, 600, 800, 1000, 1250, 1500, 1750, and 2000 individually, as well as any other number subsumed in the range. Furthermore, disclosure of a range of, for example, 0 to 2000 includes the subsets of, for example, for example, 10 to 1500, 16 to 750, 20 to 450, 5 to 50, and 10 to 40, as well as any other subset subsumed in the range. Table 5, below, defines abbreviations used throughout this application.

TABLE 5

| Abbreviations | |
|---|---|
| Abbreviation | Description |
| ° C. | degrees Celsius |
| D4 | octamethylcyclotetrasiloxane |
| DP | degree of polymerization |
| g | grams |
| GC | gas chromatography |
| GPC | gel permeation chromatography |
| HPLC | high performance liquid chromatography |
| hr | hours |
| M | molar |
| mL | milliliter |
| ppm | parts per million |
| THF | tetrahydrofuran |
| OTf or triflate | trifluoromethanesulfonate |
| μL | microliters |

Embodiments of the Invention

Ina first embodiment, a method for polymerizing polydiorganosiloxanes comprises:

Pre-1) combining starting materials comprising:
B) a metal trifluoromethane sulfonate selected from the group consisting of B-1) aluminum(III) trifluoromethanesulfonate, B-2) bismuth(III) trifluoromethane sulfonate, B-3) gallium(III) trifluoromethane sulfonate, B-4) iron(III) trifluoromethanesulfonate, and B-5) indium(III) trifluoromethane sulfonate; and
C) a ligand of general formula

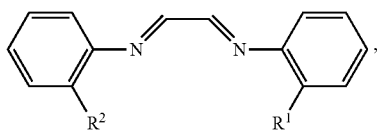

where each $R^2$ and each $R^1$ are an independently selected alkyl groups of 1 to 8 carbon atoms, thereby forming a catalyst;
1) heating, at a temperature of 50° C. to 200° C., a reaction mixture prepared by mixing the catalyst with starting materials comprising
A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
optionally D) a solvent;
2) quenching the reaction mixture; and
3) recovering a product from the reaction mixture, where the product has unit formula $[(HO)R_2SiO_{1/2}]_2(R_2SiO_{2/2})_m$, where m>n.

In a second embodiment, in the method of the first embodiment, each R is independently selected from the group consisting of alkyl, alkenyl, and aryl.

In a third embodiment, in the method of the second embodiment, each alkyl is methyl, each alkenyl is selected from the group consisting of vinyl, allyl, and hexenyl, and each aryl is phenyl.

In a fourth embodiment, in the method of the first embodiment, subscript n is 5 to 2000, alternatively 5 to 200, alternatively 10 to 150, alternatively 15 to 100, alternatively 20 to 50, and alternatively 25 to 35.

In a fifth embodiment, in the method of the first embodiment, the metal trifluoromethane sulfonate is present in an amount of 10 ppm to 500 ppm based on the weight of starting material A).

In a sixth embodiment, in the method of the first embodiment, the metal trifluoromethane sulfonate is selected from the group consisting of B-2) bismuth(III) trifluoromethane sulfonate, B-3) gallium(III) trifluoromethane sulfonate, and B-4) iron(III) trifluoromethanesulfonate.

In a seventh embodiment, in the method of the first embodiment, the metal trifluoromethane sulfonate is selected from the group consisting of B-1) aluminum(III) trifluoromethane sulfonate and B-5) indium(III) trifluoromethane sulfonate.

In an eighth embodiment, in the method of the first embodiment, starting material C) is

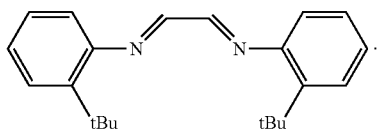 [SMILES: CC(C)(C)c1ccccc1/N=C/C=N/c1ccccc1C(C)(C)C]

In a ninth embodiment, in the first embodiment starting material D), a solvent, is present.

In a tenth embodiment, in the method of the ninth embodiment, the solvent is selected from the group consisting of aprotic solvents and trimethylsiloxy-terminated polydimethylsiloxanes.

In an eleventh embodiment, in the method of the first embodiment, step pre-1) is performed by mixing at ambient pressure and temperature.

In a twelfth embodiment, in the method of the first embodiment, step 1) is performed by heating at a temperature of 80° C. to 105° C. for 30 seconds to 2 hours at ambient pressure.

In a thirteenth embodiment, in the method of the first embodiment, the method further comprises removing water during and/or after step 1).

In a fourteenth embodiment, in the method of the first embodiment, step 2) is performed by adding an amine and cooling the reaction mixture to a temperature less than 50° C.

In a fifteenth embodiment, in the method of the fourteenth embodiment, the amine is N,N-dimethylcyclohexylamine.

In a sixteenth embodiment, in the method of the first embodiment, step 3) is performed by a method comprising filtering, stripping and/or distilling the reaction mixture.

Ina seventeenth embodiment, a method for polymerizing polydiorganosiloxanes comprises:
optionally Pre-1) combining starting materials comprising:
B) dicyclohexylboron trifluoromethane sulfonate; and
C) a ligand of general formula

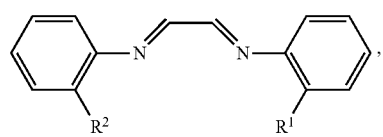

where each $R^2$ and each $R^1$ are an independently selected alkyl groups of 1 to 8 carbon atoms, thereby forming a catalyst;
1) heating, at a temperature of 50° C. to 200° C., a reaction mixture prepared by mixing B) dicyclohexylboron trifluoromethane sulfonate, or the catalyst when step pre-1) is used, with starting materials comprising
A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
optionally D) a solvent;
2) quenching the reaction mixture; and
3) recovering a product from the reaction mixture, where the product has unit formula $[(HO)R_2SiO_{1/2}]_2(R_2SiO_{2/2})_m$, where m>n.

In an eighteenth embodiment, in the method of the seventeenth embodiment, each R is independently selected from the group consisting of alkyl, alkenyl, and aryl.

In a nineteenth embodiment, in the method of the eighteenth embodiment, each alkyl is methyl, each alkenyl is selected from the group consisting of vinyl, allyl, and hexenyl, and each aryl is phenyl.

In a twentieth embodiment, in the method of the seventeenth embodiment, subscript n is 5 to 2000, alternatively 5 to 200, alternatively 10 to 150, alternatively 15 to 100, alternatively 20 to 50, and alternatively 25 to 35.

In a twenty-first embodiment, in the method of the seventeenth embodiment, starting material C) is

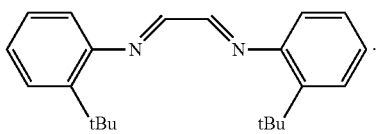

In a twenty-second embodiment, in the seventeenth embodiment starting material D), a solvent, is present.

In a twenty-third embodiment, in the method of the twenty-second embodiment, the solvent is selected from the group consisting of aprotic solvents and trimethylsiloxy-terminated polydimethylsiloxanes.

In an twenty-fourth embodiment, in the method of the seventeenth embodiment, step pre-1) is performed by mixing at ambient pressure and temperature.

In a twenty-fifth embodiment, in the method of the seventeenth embodiment, step 1) is performed by heating at a temperature of 80° C. to 105° C. for 30 seconds to 2 hours at ambient pressure.

In a twenty-sixth embodiment, in the method of the seventeenth embodiment, the method further comprises removing water during and/or after step 1).

In a twenty-seventh embodiment, in the method of the seventeenth embodiment, step 2) is performed by adding an amine and cooling the reaction mixture to a temperature less than 50° C.

In a twenty-eighth embodiment, in the method of the twenty-seventh embodiment, the amine is N,N-dimethylcyclohexylamine.

In a twenty-ninth embodiment, in the method of the seventeenth embodiment, step 3) is performed by a method comprising filtering, stripping and/or distilling the reaction mixture.

The invention claimed is:

1. A method for polymerizing polydiorganosiloxanes comprising:
   1) heating, at a temperature of 50° C. to 200° C., a reaction mixture prepared by mixing starting materials comprising
   A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
   B) 10 ppm to 500 ppm, based on weight of starting material A), of a trifluoromethane sulfonate compound selected from the group consisting of
   B-1) aluminum(III) trifluoromethanesulfonate,
   B-2) bismuth(III) trifluoromethane sulfonate,
   B-3) gallium(III) trifluoromethane sulfonate,
   B-5) indium(III) trifluoromethane sulfonate,
   B-6) scandium(III) trifluoromethane sulfonate, and
   B-7) dicyclohexylboron trifluoromethanesulfonate;
   2) quenching the reaction mixture; and
   3) recovering a product from the reaction mixture, where the product has unit formula $[(HO)R_2SiO_{1/2}]_2(R_2SiO_{2/2})_m$, where m>n.

2. The method of claim 1, where each R is independently selected from the group consisting of alkyl, alkenyl, and aryl.

3. The method of claim 1, where subscript n is 10 to 150.

4. The method of claim 1, where the trifluoromethanesulfonate compound is present in an amount of 10 ppm to 50 ppm.

5. The method of claim 1, where the trifluoromethanesulfonate compound is selected from the group consisting of B-2) bismuth(III) trifluoromethane sulfonate, B-3) gallium(III) trifluoromethane sulfonate, and B-4) iron(III) trifluoromethanesulfonate.

6. The method of claim 1, where the trifluoromethanesulfonate compound is selected from the group consisting of B-1) aluminum (III) trifluoromethane sulfonate, B-5) indium (III) trifluoromethane sulfonate, and B-6) scandium(III) trifluoromethane sulfonate.

7. The method of claim 6, further comprising: mixing B) the trifluoromethanesulfonate compound and C) a chelating ligand for the metal trifluoromethanesulfonate before step 1).

8. The method of claim 7, where C) has the general formula:

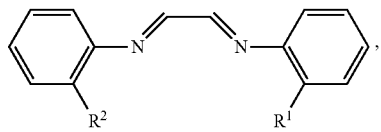

where each $R^2$ and each $R^1$ are an independently selected alkyl groups of 1 to 8 carbon atoms.

9. The method of claim 1, where starting material D), a solvent, is present.

10. The method of claim 9, where the solvent is selected from the group consisting of aprotic solvents and trimethylsiloxy-terminated polydimethylsiloxanes.

11. The method of claim 10, where the solvent is selected from the group consisting of tetrahydrofuran, toluene and dichloromethane.

12. The method of claim 1, where step 1) is performed by heating at a temperature of 80° C. to 105° C. for 30 seconds to 2 hours.

13. The method of claim 1, where the method further comprises removing water during and/or after step 1).

14. The method of claim 1, where step 2) is performed by adding an amine and cooling the reaction mixture to a temperature less than 50° C.

15. The method of claim 1, where step 3) is performed by a method comprising filtering, stripping and/or distilling the reaction mixture.

16. A method for polymerizing polydiorganosiloxanes comprising:
   1) heating, at a temperature of 50° C. to 200° C., a reaction mixture prepared by mixing starting materials comprising:
   A) a polydiorganosiloxane of unit formula $[(HO)R_2SiO_{1/2}]_2(R_2SiO_{2/2})_n$, where subscript n is 0 to 2000, and each R is an independently selected monovalent hydrocarbon group of 1 to 18 carbon atoms; and
   B) 10 ppm to 500 ppm, based on weight of starting material A), of iron(III) trifluoromethanesulfonate;
   2) quenching the reaction mixture by adding an amine and cooling the reaction mixture to a temperature less than 50° C.; and
   3) recovering a product from the reaction mixture, where the product has unit formula $[(HO)R_2SiO_{1/2}]_2(R_2SiO_{2/2})_m$, where m>n.

* * * * *